Feb. 25, 1941.  R. F. LANE  2,232,858
FREQUENCY METER
Filed July 27, 1939
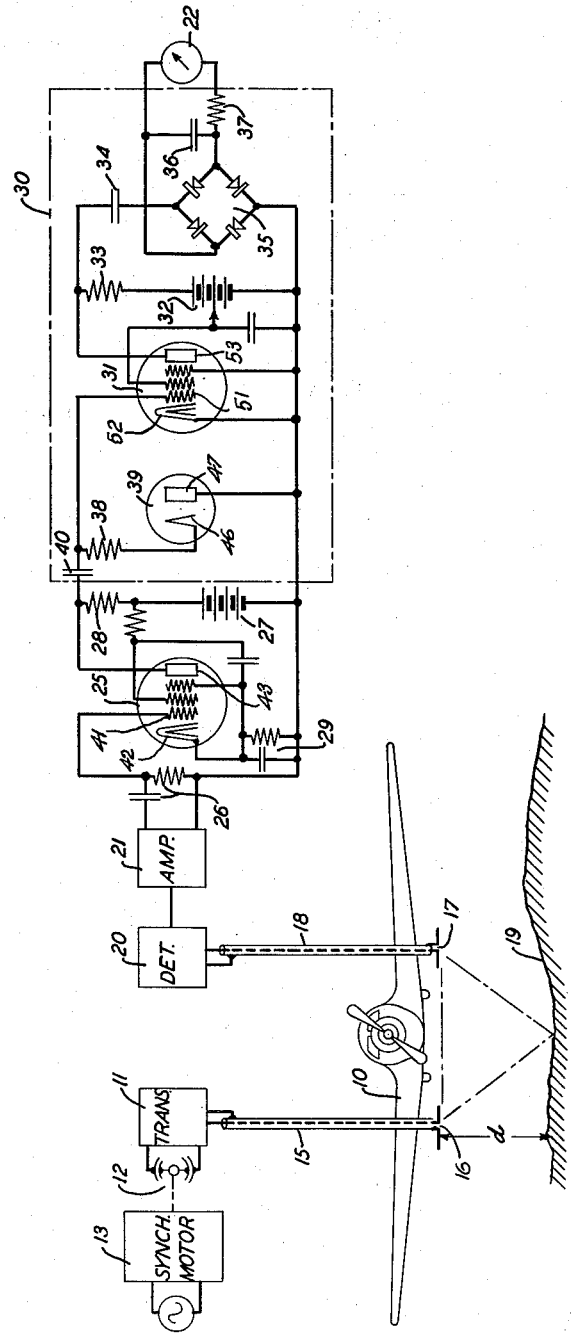
INVENTOR
R. F. LANE
BY
George C. Lord
ATTORNEY Patented Feb. 25, 1941

2,232,858

UNITED STATES PATENT OFFICE 2,232,858

FREQUENCY METER

Richard F. Lane, South Orange, N. J., assignor to Bell Telephone Laboratories, Incorporated, New York, N. Y., a corporation of New York Application July 27, 1939, Serial No. 286,879

10 Claims. (Cl. 250—1)

This invention relates to frequency measuring circuits and particularly to such circuits as are adapted for use with distance or altitude measuring systems which operate by the use of radiant energy to produce currents of varying frequency proportional to the distance or altitude.

An object of the invention is to measure the frequency of electrical currents of a wide frequency range and varying rapidly in amplitude.

Another object of the invention is to produce an accurate measurement of altitude by means of radiant energy over a wide range of altitudes and with sudden changes in the nature of the reflecting surface.

In systems for measuring distance by means of radiant energy such as that disclosed and claimed in the copending application of W. H. C. Higgins and R. C. Newhouse, Serial No. 240,876, filed November 16, 1938, Patent 2,206,896, issued July 9, 1940, there are produced electrical currents of frequency proportional to the distance being measured. Such systems are excellently adapted for use in determining the altitude of airplanes above the ground over which they are flying. When so used the frequency of the currents produced depends upon the beat frequency between a radio wave of continuous cyclicly varying frequency radiated from the airplane and the wave from the same transmitter received directly at the airplane.

The successful operation of such a system of course depends upon the use of a circuit or device for giving an accurate indication of the frequency of the currents produced. As described in the Higgins-Newhouse application referred to, one type of frequency meter which is well adapted to such use is of the so-called pulse counting type. In such a frequency meter, a condenser is completely charged and discharged once each cycle of the current being measured so that the displacement current of the condenser is a measure of the frequency. The charge and discharge of the condenser is controlled by changes in the space path impedance of a vacuum tube. These changes are in turn controlled by the action of the current being measured on the grid of the tube. In the usual arrangement of such circuit, no initial bias is applied to the grid of the tube, the only bias being that due to the flow of rectified grid current. With such a circuit, the tube is normally conducting permitting the discharge of the condenser through the space path. The effect of the negative peaks of the current being measured is to raise the space path impedance of the tube to such a point that the condenser is charged from the plate battery. During the positive half cycle of the current being measured, the space path impedance is lowered to such a point that the condenser discharges through the space path impedance of the tube. The essential adjustments are that the peak values of the current being measured are such as to produce these definite variations in the space path impedance, and that the time constant of the plate circuit be such that the condenser is substantially completely charged and discharged during each cycle of the wave being measured.

When such systems are used for altitude indication with airplanes, it is of course necessary that the frequency meter operate over a wide range of frequencies. It is therefore desirable that the coupling to the grid of the frequency meter tube be made through a circuit having a characteristic which is independent of frequency over a wide range. A resistance-capacity coupling circuit is well suited for such use. However, when such a circuit is designed to have a low attenuation at low frequencies, it has been found that its time constant is such as to cause erroneous indications with signals of rapidly varying strength.

Thus when the instrument is operating at high altitudes with a good reflecting surface, giving a high signal strength, the coupling condenser will become charged to a high negative voltage. If then the plane suddenly passes over ground of poor reflecting quality the signal strength will be greatly reduced. The high negative bias on the grid due to the high charge on the coupling condenser from the previous signals will prevent the positive peaks of the new signal from driving the grid positive. Thus, an inaccurate indication of frequency and altitude will be given until sufficient time has elapsed for the residual charge on the coupling condenser to leak off.

The over-all result is that the instrument reads low when flying over rough ground which produces sudden changes in signal strength.

On the other hand, if the time constant of the coupling circuit is made such as to take care of such conditions of rapidly varying signal strength, the attenuation of the circuit for low frequencies will be too high to permit satisfactory operation. This condition is accentuated by the fact that under the conditions which produce low frequencies, namely, low altitudes, there are present harmonics of the fundamental frequency which represents the altitude. With a coupling circuit of low time constant, these harmonics would be accentuated at the expense of the fundamental so that the meter would measure the harmonics rather than the fundamental, giving a false indication.

In accordance with this invention it has been found that these obstacles may be overcome and satisfactory operation obtained by the use of a diode in the grid leak resistance path of the frequency meter tube as will be described in detail in the following detailed description.

The drawing is a schematic diagram of a radiant energy altitude measuring instrument for aircraft embodying the frequency measuring circuit of this invention.

This instrument comprises an ultra-short wave radio transmitter 11 equipped with a rotating condenser 12 driven by a synchronous motor 13 for continuously varying the frequency of the transmitter. The output of the transmitter is conducted through a coaxial transmission line 15 to a half wave dipole antenna 16 which is mounted approximately a quarter wave-length below the metal surface of the wing of the airplane 10 which acts as a reflector.

A second similar half wave dipole antenna 17 mounted in axial alignment with the antenna 16 is connected through a transmission line 18 to a detector 20. As indicated in the diagram, the wave generated by the transmitter 11 and radiated by the antenna 16 will be directly transmitted to the antenna 17 and also transmitted thereto by reflection from the surface of the earth 19 or other objects, the distance of which it is desired to measure. The directly transmitted and the reflected signal components are supplied to the detector 20 in which they combine to produce the useful demodulation product which is a signal whose instantaneous frequency is equal to the instantaneous difference in the frequency of the two component waves. This difference frequency product is amplified in the amplifiers 21 and 25, and its frequency is measured by the circuit 30. The meter 22 gives an indication of the frequency and may be directly calibrated in altitude.

Since the frequency of the waves transmitted from the antenna 16 is varying at a known rate, the average value of the frequency difference is a measure of the time of travel from the reflected wave and consequently the altitude, that is, the distance $d$ between the measuring apparatus and the reflecting surface 19.

The amplifier 21 in which the beat frequency currents are amplified, before the frequency is measured in the frequency measuring circuit 30, is preferably of special type. A detailed description of this amplifier and the over-all system is given in the Higgins-Newhouse application referred to. While the characteristics of the amplifier circuit are important as regards the satisfactory operation of the altitude indicator, they have no direct bearing on the present invention and consequently are not shown herein but reference is made to that application for any details thereof.

The output of the amplifier 21 is applied to the control grid 41 and cathode 42 of the pentode tube 25 (which may also be considered as being the output stage of the amplifier 21). This tube is operated in a conventional pentode amplifier circuit, the input being applied through the resistance-capacity coupling circuit 26. Plate current is supplied from the battery 27 through the plate resistor 28 to the anode 43 and grid bias through the resistance-capacity circuit 29, connected in the lead to the cathode 42.

The frequency meter circuit 30 comprises a pentode tube 31 having a plate battery 32 connected between the cathode 52 and anode 53 through a resistor 33. Also connected in the plate circuit between the plate 53 and cathode 52 is a condenser 34 and a bridge type rectifier 35. The milliammeter 22 is connected across the other two terminals of the bridge rectifier 35 through the circuit comprising the condenser 36 and resistor 37.

Connected between the control grid 51 and cathode 52 of the tube 31 is a grid leak resistor circuit comprising the resistor 38 and the diode tube 39. The cathode 46 of this diode is connected through the resistor 38 to the grid 51 of the tube 31 and the anode 47 is connected to the cathode 52 of the tube 31. This grid leak resistor circuit in combination with the coupling condenser 40 serves to supply the amplified output voltage of the tube 25 to the grid 51 of the tube 31.

The operation of the frequency meter circuit may be described as follows: starting at a time when no signal is applied to the grid 51 of the tube 31, the internal impedance from plate to cathode of the tube 31 is extremely low compared to the resistance of the resistor 33 so that the voltage of the plate 53 is practically the same as that of the cathode 52. As a result, the condenser 34 is discharged. When there is applied to the grid 51 of the tube 31, an alternating current voltage, the negative peak of which is sufficient to cut off the plate current, the condenser 34 charges from the battery 32 through the resistor 33. Provided the tube is blocked long enough in comparison with the time constant of the condenser 34 and resistor 33, the condenser will fully charge to the voltage of the battery 32. The circuit is designed for such operation with respect to the currents, the frequency of which is to be measured.

During the succeeding positive peak of the exciting voltage applied to the grid of the tube 31, the space path of the tube will be rendered conductive permitting the condenser to again discharge to practically zero voltage. Since the action of the rectifier 35 causes both the charging and discharging currents of the condenser to flow through the meter 22 in the same direction, a deflection is produced in the meter 22.

A frequency of N-cycles per second applied to the grid of the tube 31 causes a current equal approximately to 2NCE amperes to flow through the meter; where C is the capacity of the condenser 34 in farads and E is the voltage of the battery 32. Thus it will be seen that the rectified current and consequently the meter deflection will be proportional to the frequency of the exciting oscillations applied to the grid 51 of the tube 31 and independent of their amplitude.

In one particular embodiment of the circuit in an altimeter, the condenser 34 was given a capacity of approximately 180 micromicrofarads and the resistor 32 a value of 20,000 ohms. This gave a nearly linear scale up to 30,000 cycles except for the capacity between the discs of the elements of the rectifier 35. This capacity acts as a shunt for the higher frequencies when a high resistance (570 ohms) type of indicating meter is used as the meter 22.

Since this effect tended to compress the high frequency part of the scale and expand the low frequency portion, additional capacity in the form of the condenser 36 was shunted across the rectifier output and a resistor 37 placed in series with the meter 22. The action of this circuit was to further compress the high frequency portion of the scale and reduce the effect of variations in the rectifier capacities. In this way the low frequency portion of the scale was expanded so that when using a meter with a scale of the 270-degree type, indications up to 5,000 feet could be obtained on one scale.

The purpose of the diode 39 in series with the resistor 38 between the grid 51 and cathode 52 of the tube 31 is to permit reducing the time constant of the circuit comprising the condenser 40 and resistance 38 without producing the corresponding attenuation at low frequencies. Thus, while it would normally be expected that with a coupling condenser 40 of .001 microfarad the grid leak resistor of the tube 31 would have to be about as large as 1 megohm to avoid undue loss at 160 cycles, by the use of the diode 39, the resistor 38 can be made as low as 100,000 ohms without appreciably hindering the low frequency response.

This reduced value for the grid leak resistor permits the circuit to recover faster in the case where there is a sudden reduction in signal strength from the condition where there is being received a signal of such strength that a high bias voltage is built up on the grid 51 of the tube 31. Under such conditions if the signal strength suddenly drops to a value just sufficient or only slightly more than sufficient to operate the frequency meter if there were no bias on the grid 51 of the tube 31, the high bias voltage due to the accumulated charge on the condenser 39 must discharge through the grid leak resistor before satisfactory operation occurs. Prior to the time of the discharge of this accumulated charge, the lower level of input voltage will be insufficient to overcome the negative bias on the grid and consequently the plate resistance of the tube 31 will not be sufficiently reduced to permit complete discharge of the condenser 34. During the time required for the condenser 39 to discharge to such a value, the frequency meter is not accurate. This results in the indicator reading low when flying over rough ground which produces such sudden changes in signal strength.

With the diode 39 in circuit and with a comparatively low value such as 100,000 ohms for resistor 38, the time constant of the circuit including condenser 40, resistor 38 and diode 39 is low for the discharge of negative charges on the condenser 39, since the discharge of such charges is through the diode 39 in its conducting direction. This permits the grid bias of the tube 31 due to negative charges on the condenser 40 to decay rapidly and improves the operation of the instrument at high altitudes where such sudden changes in signal strength are likely to occur.

On the other hand, the low time constant of the circuit comprising condenser 40, resistor 38 and diode 39 occurs only in the negative or discharge direction since for positive peaks of the signal, the diode 39 is non-conducting. As a result, the input impedance of the circuit for such positive peaks is high and gives satisfactory performance of the measuring circuits at low frequencies. Positive charges will not accumulate on condenser 40 as they will be discharged through the grid-cathode path of the tube 31.

When an attempt is made to obtain the same effect merely by the use of a conventional condenser-resistor circuit of low time constant, false operation at low amplitudes was found to result. This appears to be due to the fact that such a circuit would give a characteristic which was frequency selective emphasizing the higher frequencies at the expense of the lower. At such low altitudes the lower frequencies are the ones which it is desired to measure. With the frequency selective action due to the low time constant coupling circuit, the harmonics (representing spurious modulations) of the signal frequency would predominate in their effect on the meter circuit and consequently a false indication would occur.

While the circuit is described and shown with the use of a diode in the grid leak path, clearly other types of unilateral resistance elements could be used with equivalent results. This and other modifications of the specific embodiment of the particular circuit described herein may be made without departing from the spirit of the invention as defined in the appended claims.

What is claimed is:

1. A frequency measuring circuit comprising a condenser, a vacuum tube having an anode, a cathode and a grid and arranged to cause the charge and discharge of said condenser by definite changes in the space path impedance, means for giving an indication of the average displacement current of said condenser, and a circuit comprising a series condenser and a shunt resistor for applying waves to be measured between the grid and cathode of said tube to produce such definite changes in the space path impedance, said shunt resistor having a low impedance for negative voltages on said grid and a relatively high impedance for positive voltages on said grid.

2. A frequency measuring circuit according to claim 1 in which said shunt resistor includes a diode having an anode connected to the cathode of said tube and a cathode connected to the grid of said tube.

3. A frequency meter comprising a vacuum tube having a cathode, an anode and a control grid, a circuit including a condenser, a resistor and a source of direct current voltage so connected between the anode and cathode of said tube that definite changes in the space path impedance of said tube produce substantially complete charge and discharge of said condenser, means for giving an indication of the average displacement current of said condenser, and means for applying the wave to be measured between the control grid and cathode of said tube to produce said definite changes in the space path impedance, said means including a unilateral conducting device connected between the control grid and cathode of said tube.

4. A frequency meter according to claim 3 in which said unilateral conducting device is so connected as to have a low impedance when said grid is negative with respect to the cathode and a high impedance when said grid is positive with respect to the cathode.

5. In a circuit for giving instantaneous indications of the frequency of waves of a wide range of frequencies and rapidly varying amplitudes, a vacuum tube having a cathode, an anode and a control grid, an anode-cathode circuit for said tube having two parallel paths one of said parallel paths comprising a condenser and a rectifier connected in series and the other of said parallel paths comprising a resistor and a source of direct current voltage connected in series, means for applying the wave to be measured between the control grid and cathode of said tube to produce such definite changes in the space path impedance thereof as to cause said condenser to substantially fully charge and discharge once during each cycle of the wave to be measured, means for giving an indication of the average displacement current of said condenser, and a unilateral conducting device connected between the control grid and cathode of said tube to offer a substantially low impedance to negative charges on said grid and a substantially high impedance to positive charges thereon.

6. A circuit according to claim 5 in which the unilateral conducting device is a diode having a cathode connected to said grid and an anode connected to the cathode of said tube.

7. In a distance determining system including a first means for securing an electrical current having a frequency proportional to the distance being ascertained, means for measuring the frequency of said current comprising a vacuum tube having a cathode, an anode and a control grid, means for applying the current to be measured between the control grid and cathode of said tube to substantially block the anode-cathode path once each cycle thereof, a condenser and a source of direct current connected in parallel to the anode-cathode path of said tube so that the condenser is substantially completely charged from said source and discharged through said anode-cathode path once during each cycle of said current, means for giving an indication of the average displacement current of said condenser, and a unilateral conducting device connected between said control grid and cathode to offer a low impedance to negative charges on said control grid and a relatively high impedance to positive charges thereon.

8. A radiant energy altitude indicator for aircraft including means for securing a current having a frequency proportional to the altitude of the aircraft, means for measuring the frequency of said current comprising a vacuum tube having a cathode, an anode and a control grid, means for applying the current to be measured between the control grid and cathode of said tube to produce definite changes in the space path impedance thereof from low to high and vice versa during each cycle of said current, an anode-cathode circuit for said tube comprising two parallel paths, one including a condenser and rectifier in series and the other including a resistor and a source of direct current voltage in series, said anode-cathode circuit having such a time constant as to permit substantially complete charge and discharge of said condenser once during each cycle of said current, means for giving an indication of the average displacement current of said condenser and a unilateral conducting device connected between the grid and cathode of said tube to offer a low impedance to negative charges on said grid and a relatively high impedance to positive charges thereon.

9. The combination according to claim 8 in which said unilaterally conducting impedance is a diode having a cathode connected to said control grid and an anode connected to the cathode of said tube.

10. In a radiant energy altitude indicator for aircraft including means for securing a current having a frequency proportional to the altitude, means for measuring the frequency of such current comprising a vacuum tube having a cathode, an anode and a control electrode, an anode circuit for said tube comprising a condenser connected between the anode and cathode, a resistor and a source of direct current voltage, said resistor and source being connected in series with each other and in shunt to said condenser, the time constant of said anode circuit being such that said condenser may be substantially completely charged and discharged during a single cycle of said current, means for applying said current between the control electrode and cathode of said tube to produce a distinct change in the impedance of the tube once each cycle of said wave, means for rectifying the current through said condenser, means for indicating the mean value of the rectified current, and a unilaterally conducting device connected between said control electrode and cathode to offer a low impedance to negative charges on said control grid and a relatively high impedance to positive charges thereon.

RICHARD F. LANE.